United States Patent [19]

Audibert

[11] Patent Number: 5,085,447
[45] Date of Patent: Feb. 4, 1992

[54] FOLDING FURNITURE STRUCTURE

[76] Inventor: Jacques J. Audibert, 59 avenue de la Bourdonnais, 75007 Paris, France

[21] Appl. No.: 561,897

[22] Filed: Aug. 2, 1990

[30] Foreign Application Priority Data

Aug. 10, 1989 [FR] France ................. 89 10760
Feb. 12, 1990 [FR] France ................. 90 01603

[51] Int. Cl.$^5$ .................... B62B 1/04; A47B 3/083
[52] U.S. Cl. .................... 280/30; 108/113; 280/652; 280/47.18; 280/47.3; 280/47.33; D6/335
[58] Field of Search ........... 108/112, 113, 114; D6/335, 336; 280/30, 47.3, 47.31, 47.33, 656, 652, 47.18, 35, 641, 645

[56] References Cited

U.S. PATENT DOCUMENTS

| | | | |
|---|---|---|---|
| 1,828,780 | 10/1931 | McKnight | 108/113 |
| 2,903,313 | 9/1959 | Block | 108/112 X |
| 2,911,217 | 11/1959 | Hirsch et al. | 108/112 X |
| 2,991,139 | 7/1961 | Fihe | 108/113 |
| 4,133,271 | 1/1979 | Carlson | 108/113 |
| 4,439,085 | 3/1984 | Rodriguex et al. | 414/447 |

FOREIGN PATENT DOCUMENTS

| | | |
|---|---|---|
| 738868 | 12/1932 | France . |
| 968610 | 12/1950 | France . |
| 2138048 | 12/1972 | France . |
| 672192 | 5/1952 | United Kingdom . |

Primary Examiner—Andres Kashnikow
Assistant Examiner—Michael Mar
Attorney, Agent, or Firm—W. Thad Adams, III

[57] ABSTRACT

The folding furniture structure, which is capable of having a folded configuration and an unfolded configuration, comprises a tray (2, 3) supported by a pair of opposite underframes (14) each having an upper end and a lower end, the tray being divided into two parts (2, 3) along a first hinge line (Z, Z').

Each of the underframes is hinged:
at its upper end, along a second hinge line (Y, Y'), with respect to the edge of the tray portion (2, 3) which it supports, opposite the first hinge line (Z, Z'), and
at its lower end, along a third hinge line (X, X'), with respect to an end of a generally flat frame (15), so that in the folded configuration of the structure, each of the underframes (14) rests on a part of the frame (15), defining a flat support on each side of the tray portions (2, 3) which are applied against each other and project upwards with respect to the frame.

4 Claims, 7 Drawing Sheets

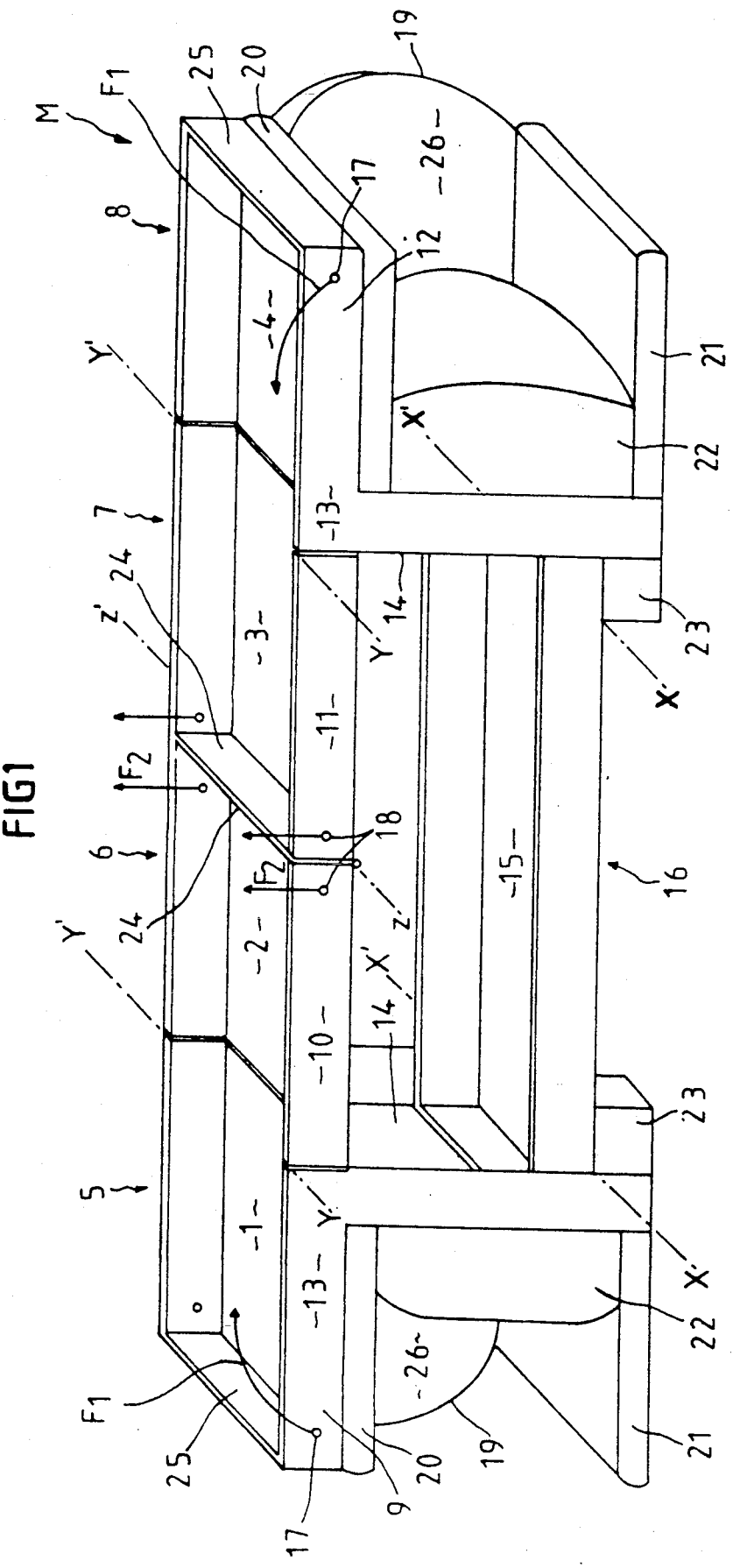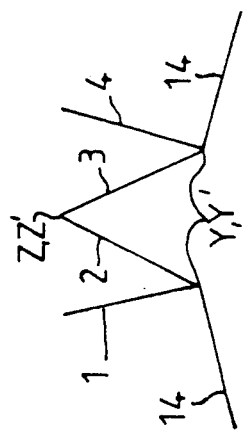

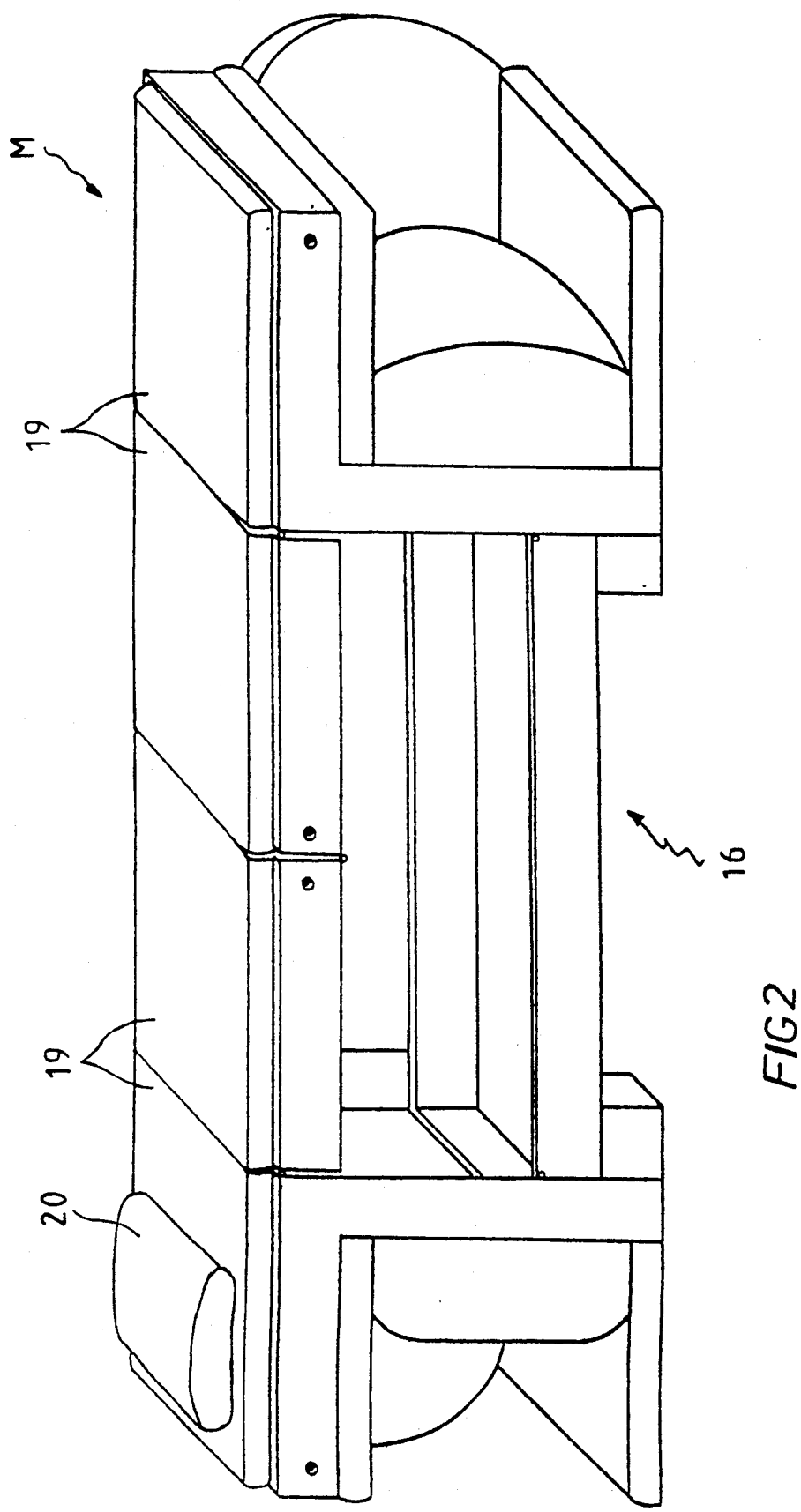

FOLDING FURNITURE STRUCTURE

The present invention relates to a folding furniture structure, capable of having a folded configuration and an unfolded configuration, and which has two distinct uses depending on its configuration. It is then in fact a transformable structure.

More precisely, the structure comprises a tray supported by a pair of opposite underframes each having an upper end and a lower end, said tray being divided into two parts along a hinge line, called "first hinge line".

By "underframe" is meant in the present description and in the claims either a pair of separate feet, or a pair of feet joined together by at least one cross-piece or a panel, or a panel serving as legs, or any other equivalent support means.

The Applicant has discovered that, from such a structure, it was possible to design multiple furniture elements which are transformable by folding or unfolding, particularly that of a bed transformable into a pair of armchairs, a bed transformable into a table, a garden table transformable into a wheel-barrow, and reciprocally.

To this end, the structure according to the invention is characterized in that each of said underframes is hinged:
- at its upper end, along a second hinge line, with respect to the edge of the tray portion which it supports, opposite said first hinge line, and
- at its lower end, along a second hinge line, with respect to an end of a generally flat frame, so that in the folded configuration of the structure, each of said underframes rests on a part of said frame, defining a flat support on each side of said tray portions which are applied against each other and projects upwards with respect to said frame.

Generally, in the unfolded configuration, the tray is parallel to the frame and the structure offers a configuration in the form of a rectangular parallelogram in the plane perpendicular to said first hinge line.

In practice, the pivoting angle about the first, second and third hinge lines is limited by appropriate stops.

Advantageously, the structure of the invention satisfies the relation $$L \geq 2(d+e)$$

in which formula:
L=length of the frame
d=distance between the upper face of the tray and the third hinge line of the underframes on the frame
e=thickness of the tray.

In a preferred embodiment, the tray comprises two end portions each fixed to one of said underframes and two central portions, said tray having an upper face and a lower face, the structure of the invention being characterized in that said central tray portions are hinged together along said first hinge line and, on the adjacent end tray portion, along said second hinge line, said hinges being such that the central tray portions may be placed together lower face against lower face and so that the end tray portions may be applied against the adjacent central tray portion, upper face against upper face.

In a first application of the invention the structure forms a bed transformable into a pair of seats.

To this end, each end portion of the tray and the underframe which is fixed thereto form a support, respectively for a substantially vertical cushion and for a substantially horizontal sitting portion, which seat is tipped laterally when the structure is in the unfolded configuration and is in a position of use when the structure is in the folded configuration.

In the unfolded configuration of the structure, the tray is fitted with cushions, the succession of which forms a mattress.

In a first embodiment, one at least of the seats is an armchair whose vertical cushion forms an arm-rest.

In a second embodiment, one at least of the seats is a fireside chair, whose vertical cushion forms a seat-back.

Preferably, the frame defines a box adapted to offer a storage volume. This volume may be accessible only when the structure is in the unfolded configuration and, in the case of application in public or professional premises mentioned further on, it may be used for storing, among other things, a first-aid kit.

In another application of the invention, the furniture structure is a bed transformable into a table.

For this, each end tray portion has along its edge distant from the second hinge line, called "distal edge", a panel parallel to the underframe to which said tray portion is fixed, said panel projecting beyond that one of the faces of said end tray portion which is opposite the underframe, over a height substantially equal to the thickness of the tray, so-called "upper" zone of the panel, and beyond the other face of said end tray portion over a height substantially equal to the length of a central tray portion, called "lower" zone of the panel.

In the folded configuration of the structure, the free edges of the upper zones of the panels come into a mutual juxtaposition relation whereas said panels come into alignment with each other while occupying a horizontal plane: said panels then define together a table top.

In the unfolded configuration of the structure, the panels are spaced apart from each other and oriented vertically and the free edges of their lower zones rest on the ground. They then form a bed head and foot.

Preferably, each end tray portion comprises, along its distal edge, a parallelepipedic coffer on the distal end face of which said panel is fixed, an edge of the latter being flush with the face of said coffer parallel to the end tray portion and distant therefrom.

In the unfolded configuration of the structure, it comprises then, at the head and at the foot of the bed, an accessible coffer which may be used for storage purposes.

The bed transformable into a seat and the bed transformable into a table will find their application in premises where an extra bed may be useful, for example in a private house having little space available or in public or professional premises for allowing a person, who feels indisposed, to lie down momentarily.

In another application of the invention, the structure serves for forming a garden table transformable into a wheel-barrow, particularly for transporting garden chairs, a parasol etc..

For this, the frame comprises, in the vicinity of a third hinge line on a first underframe, a pair of members resting on the ground whereas the second underframe is provided with an assembly forming a support for a wheel, so that in the folded configuration of the table, it rests on the ground via said wheel and said pair of members resting on the ground.

In practice, the hinges between the underframes and the frame allow pivoting limited to 90° and the hinges between the tray portions allow pivoting limited to 180°.

Advantageously, each of the tray portions comprises at the level of its hinge zone with the adjacent tray portion, projections adapted to secure said adjacent tray portion in the unfolded configuration of the table.

The wheel support has a geometry such that, in the unfolded configuration, the wheel is not in contact with the ground, contact taking place at the time when the underframe, from which the wheel support assembly depends, is brought down on to the frame.

In the folded configuration of the table, the lower portion of the first underframe, beyond the hinge on the frame, forms handles for gripping and lifting the assembly for moving same on the wheel, in the manner of a wheel-barrow.

In the folded configuration of the table, each underframe defines a flat support adapted for receiving a load to be transported by the wheel-barrow, and appropriate means are provided for holding the load against sliding.

In practice, each underframe is formed of a pair of feet joined together by at least one cross-piece and the frame comprises two longitudinal members to each end of which the pairs of feet are hinged. In a variant, the frame has the form of an H whose parallel bars form cross-pieces and whose cross-bar forms a longitudinal member.

Different embodiments of the invention are described hereafter with reference to the accompanying drawings in which:

FIG. 1 shows, in its application to the construction of a bed transformable into a pair of armchairs, the furniture structure in the unfolded configuration, the tray being without cushions;

FIG. 1a is a diagram showing the tray during folding;

FIG. 2 is a Figure similar to FIG. 1, the tray being however provided with cushions forming a mattress;

Figure 3:
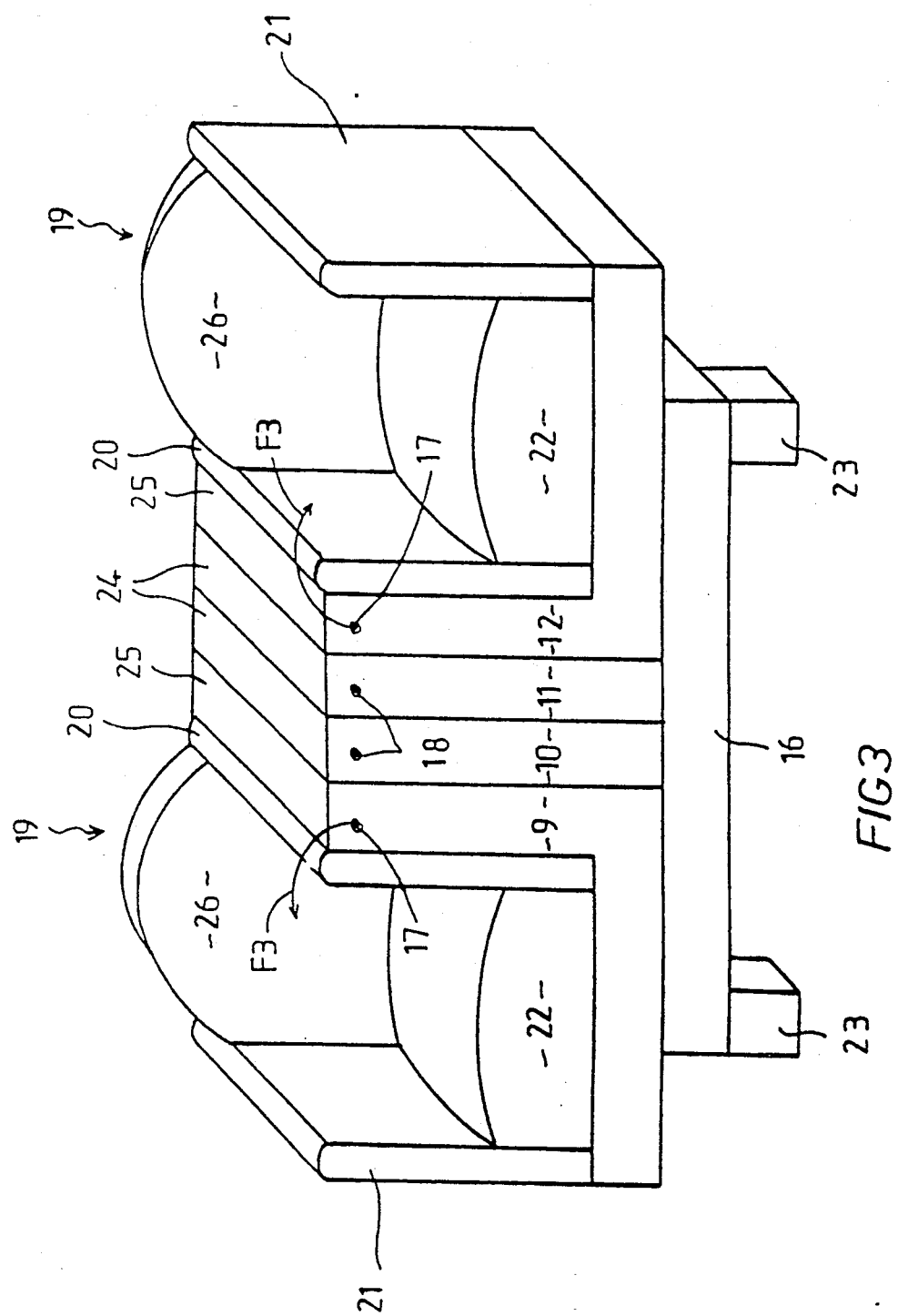
FIG. 3 shows the furniture structure of FIGS. 1 and 2 in the folded configuration.

Referring to FIG. 1, a piece of furniture M1 is shown formed of an upper tray in four parts 1–4, each of these parts forming the bottom of a rectangular box 5–8, which only comprises three lateral walls disposed in the form of a U. The end boxes 5 and 8 form an integral part of an L shaped structure 13, one wing of which is formed by a box bottom 1, 4 and the other wing of which is designated by the reference 14.

The piece of furniture M1 further comprises a lower tray 15 which also belongs to a box 16 and whose essential purpose is that of a frame. The box 16 rests on feet 23.

The two L shaped structures 13 are mounted for pivoting, on the one hand, on frame 16 along two axes X—X' and, on the other hand, on boxes 6 and 7 along the two axes Y—Y'. Furthermore, boxes 6 and 7 are mounted for pivoting one on the other along the axis Z—Z'.

As can be seen, the front and rear side walls 9 and 12 of boxes 5 and 8 and those 10 and 11 of boxes 6 and 7 have circular cut-outs, respectively 17 and 18, forming gripping means.

In its unfolded configuration of FIG. 1, the piece of furniture M1 can be formed into an extra bed as shown in FIG. 2. For this, a cushion 19 is placed in each of boxes 5–8 and the set of cushions forms a mattress. A pillow 20 may complete the assembly.

Box 16 may serve for storing the pillow 20 and, depending on the use contemplated for the piece of furniture, a first-aid kit, books, an alarm clock, etc . . .

It is further clear from FIG. 1 that, in its unfolded configuration, the piece of furniture M1 comprises two armchairs 19 tilted laterally. The arm-rests 20 of said armchairs 19 are fixed respectively to the box bottoms 1 and 4, whereas the arm-rests 21 rest on the ground. The sitting portion 22 of armchairs 19 is fixed to the leg 14 of the L shaped element 13. The seat-back is designated by the reference 26.

If, by means of the cut-outs 17 and 18, a tractive force is exerted respectively in the direction of arrows F1 and F2 (FIG. 1), the tray 1–4 folds to a W shape about axes Z—Z' and Y—Y' (FIG. 1a), so that the open face of box 5 is applied against the open face of box 6 and so that the open face of box 7 is applied against the open face of box 8, whereas the bottoms 2 and 3 of boxes 6 and 7 are applied against each other. Simultaneously, the wings 14 which are fixed to boxes 5 and 8 pivot about axes X—X' and, at the end of travel, the folded piece of furniture M1 has the configuration shown in FIG. 3.

In this configuration, the armchairs 19 are in the position of use. The median side walls 24 of boxes 6 and 7 and the end ones 25 of boxes 5 and 8 form together a horizontal plate on which a lamp, an ashtray, for example, may be laid.

As can be seen, in this folded configuration, the storage volume of box 16 is not accessible.

To go back to the unfolded configuration it is sufficient to exert, via cut-out 17, a tractive force in the direction of arrows F3 which causes a movement opposite that described above.

Instead of armchairs 19 oriented in the same direction, the piece of furniture M could comprise two fireside chairs oriented back to back. In this case, the armrest 21 and the seat back 26 would be omitted, the suitably curved arm-rest 20 would form a seat-back and the sitting portion 22 would be re-oriented.

The piece of furniture M1 could also comprise an armchair and a fireside chair, the seats offered then being perpendicular to each other.

Figure 4:
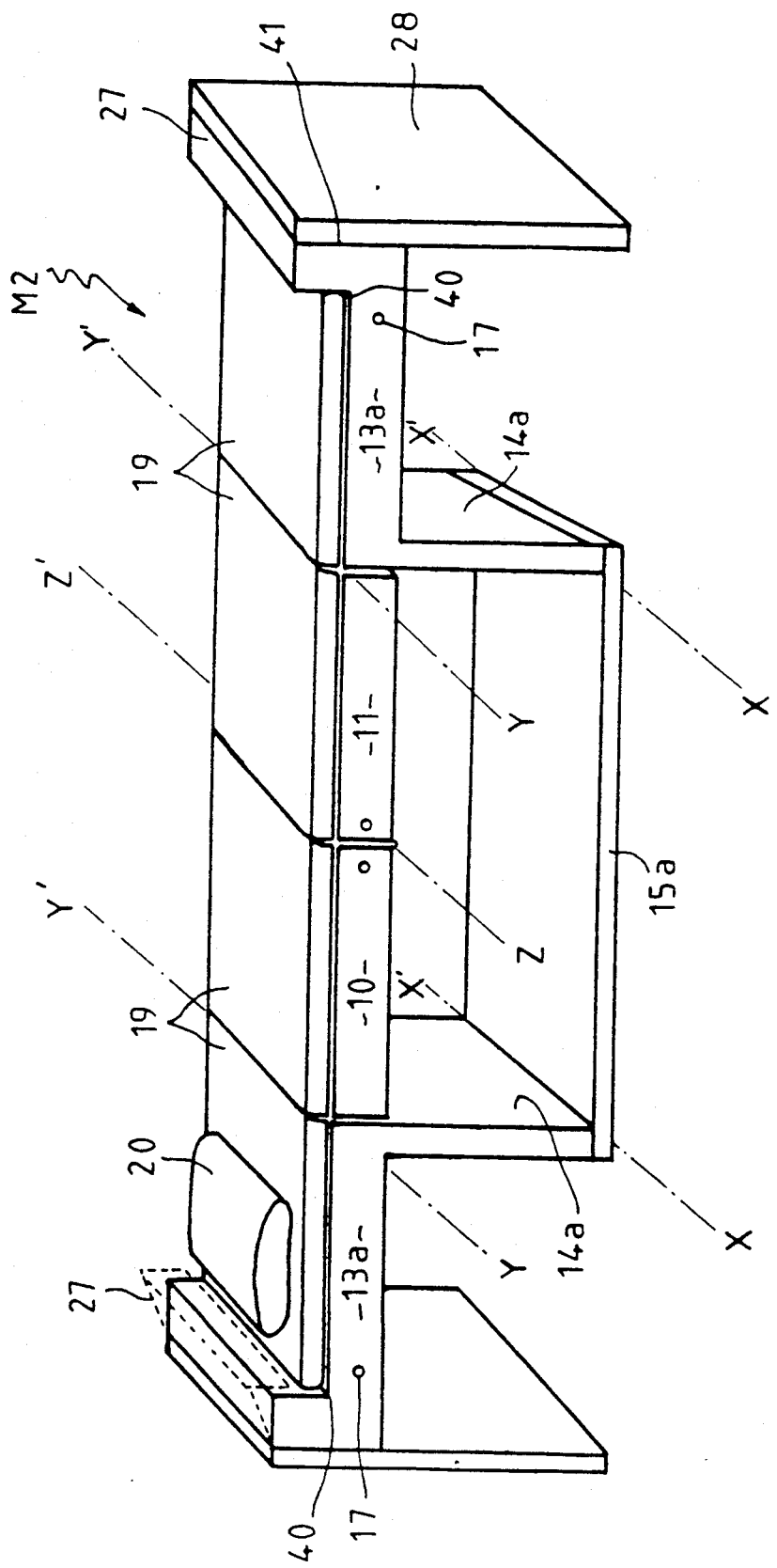
FIG. 4 shows, in its application to the construction of a bed transformable into a table, the furniture structure in the unfolded configuration.
Figure 5:
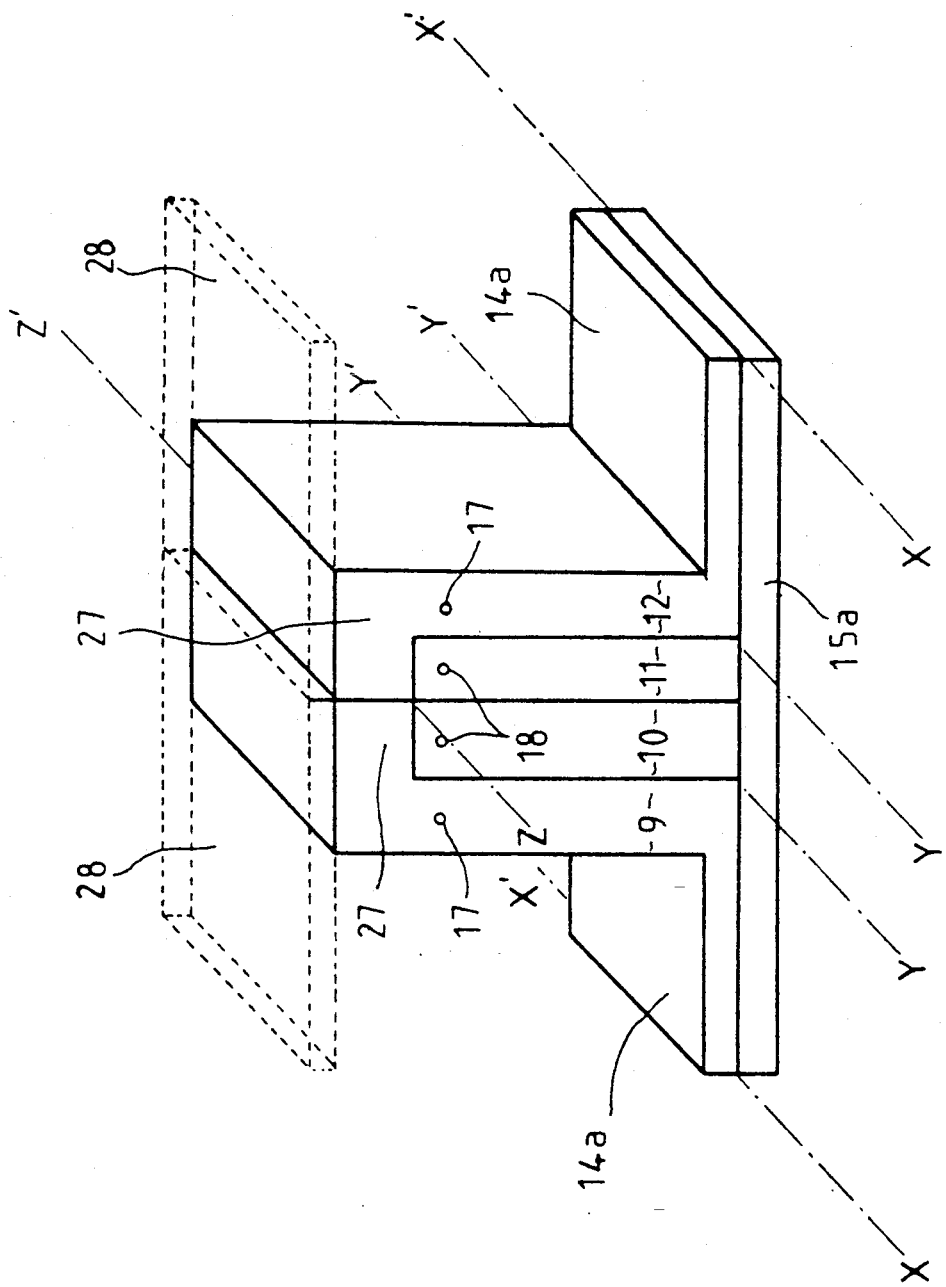
FIG. 5 shows the furniture structure of FIG. 4 in the folded configuration.

In FIGS. 4 and 5, the same references as those in FIGS. 1 and 3 have been used when it is a question of designating the same elements which will not be described again. Similar, but not identical, elements are designated by the same references as in FIGS. 1 and 3, but accompanied by the letter a.

The piece of furniture M2 of FIGS. 4 and 5 is distinguished fundamentally from the piece of furniture M by the fact that:

the frame 15a is formed of a simple plate without feet, the L shaped structure 13a is extended, along its distal edge 40, opposite the underframe 14a, and in a direction parallel to but opposite that of said underframe, by a coffer 27, shown closed with a continuous line and open by broken lines on the left hand side of FIG. 4. In addition, a panel 28 is fixed to the end distal face 41 of coffer 27. The upper edge of panel 28 is flush with the upper face of coffer 27 and its lower edge rests on the ground. Because it is fixed to coffer 27, itself fixed to the L shaped structure 13a, the panel 28 pivots when the L shaped structure 13a pivots.

Handling the piece of furniture M2 is the same as for the piece of furniture M1 and so it is useless to describe it. In FIG. 4 it can be seen that, in the unfolded configuration, the piece of furniture M2 is in the form of a bed, with a small storage chest at the head and at the foot. The space left vacant under the central tray portions may allow the storage of a suitcase when the piece of furniture M2 serves as an extra bed. In the folded configuration, the piece of furniture M2 forms a table whose top is formed by the juxtapostioning of panels 28.

Figure 6:
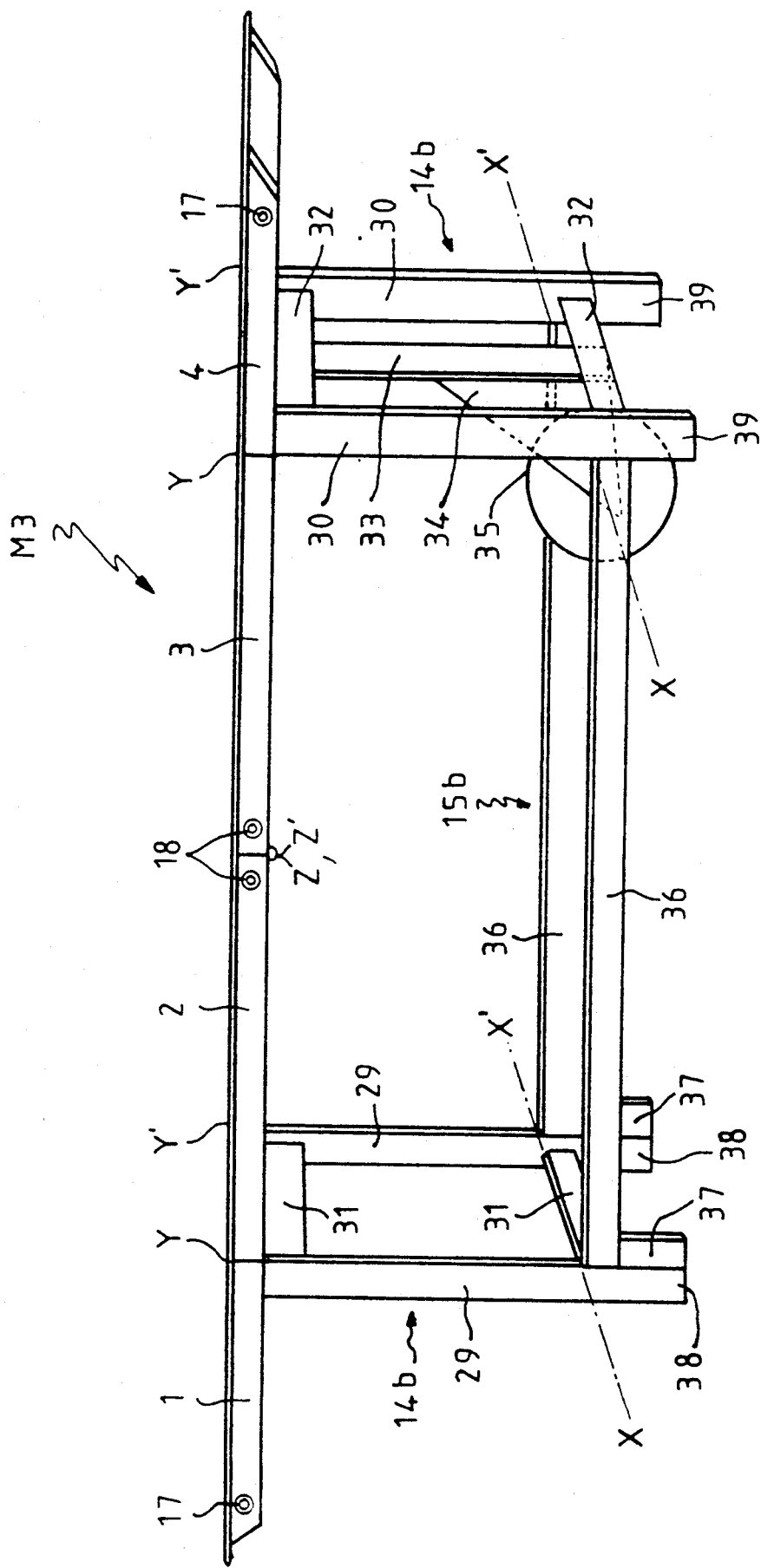
FIG. 6 shows, in its application to the construction of a table transformable into a wheel-barrow, the furniture structure in an unfolded configuration.
Figure 7:
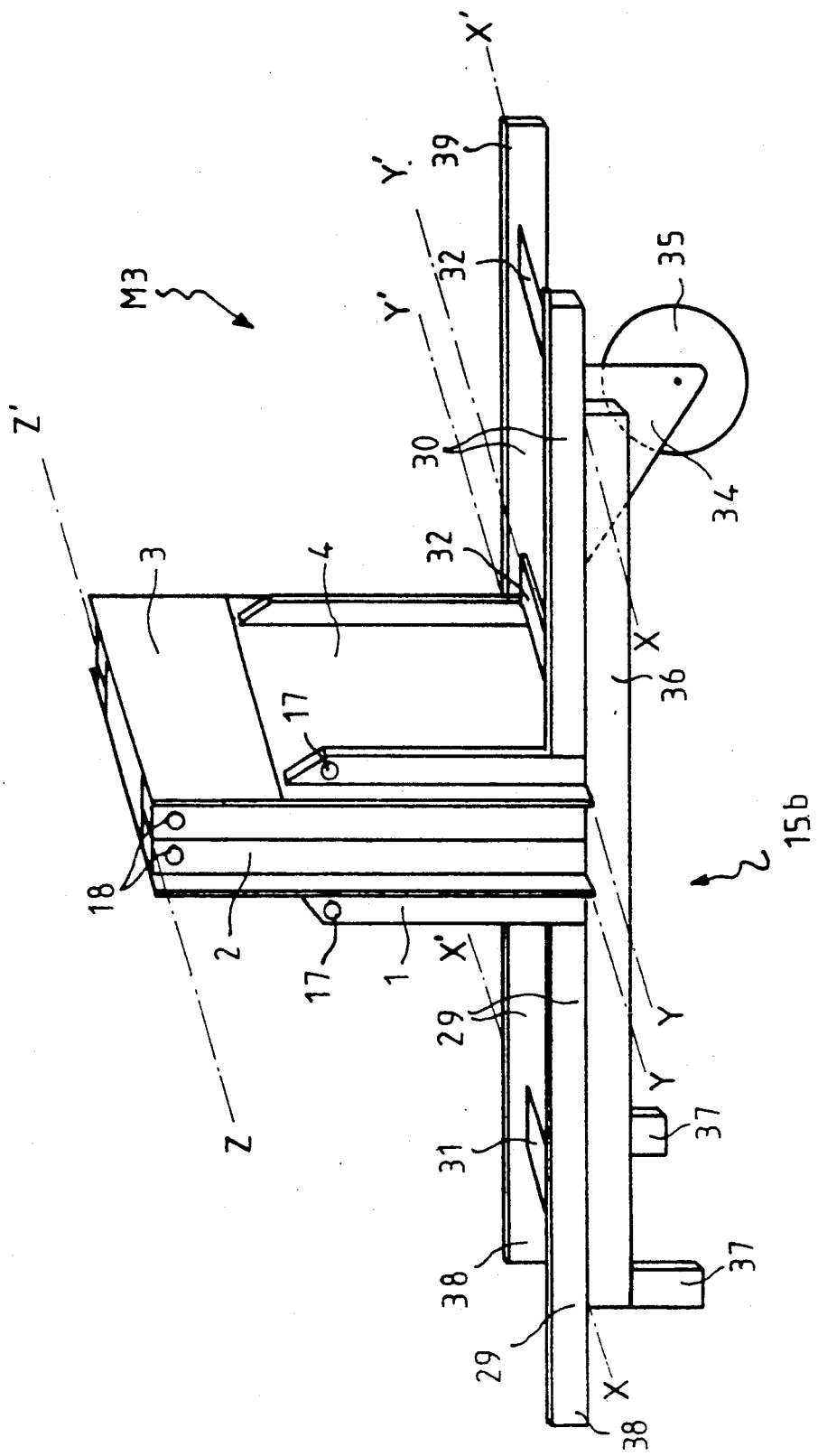
FIG. 7 shows the furniture structure of FIG. 6 in the folded configuration.

In FIGS. 6 and 7, the same references have been used as in FIGS. 1 and 3 when it is a question of designating the same elements which will not be described again. Similar, but not identical, elements are designated by the same references as in FIG. 1 and 3 but accompanied by the letter b.

The piece of furniture M3 of FIGS. 6 and 7 is distinguished basically from the piece of furniture M by the fact that:

tray 1-4 does not define boxes;

the underframes 14b are each formed of a pair of feet 29 and 30, the feet of each pair being joined together at their upper part and at their lower part by a cross-piece 31 and 32, and the cross-pieces 32 of the pair 30 being themselves joined together by a strut 33. This strut 33 serves as support for a triangular stirrup 34 between the arms of which a wheel 35 is mounted.

The frame 15b is formed of two longitudinal members 36 comprising, opposite wheel 35, a pair of feet 37.

As is clear from FIG. 6, in the unfolded configuration of the piece of furniture M3, the latter rests at one end on the base 38 of feet 29 of the underframe 14b and on the feet 37 of frame 15b and, at the other end, on the base 39 of the feet 30 of the underframe 14b. The wheel 35 does not touch the ground.

In the folded configuration (FIG. 7), the piece of furniture M3 rests on the feet 37 of frame 15b and on wheel 35. The end 38 of feet 29 which is projected beyond the hinge line X—X', forms a handle for gripping, raising and pushing the piece of furniture M3 in the manner of a wheel-barrow.

The feet 29 and the cross-pieces 31, like feet 30 and their cross-pieces 32, define a substantially flat surface capable of receiving a load to be transported, for example garden chairs. Securing means will be provided in the vicinity of ends 39 of the feet so as to prevent the load placed on feet 32 from sliding.

As is clear from the preceding description, the structure according to the invention lends itself to multiple applications and the invention is in no way limited to the embodiments described by way of examples.

In particular, in certain embodiments, namely that of FIGS. 4 and 5, the generally flat frame 15a and the third hinge lines X—X' could be virtual, when an actual frame is not necessary to secure the furniture rigidity. In such a case, by "frame" would be meant the quadrilateral defined by the lower ends of the pair of underframes.

The pieces of furniture according to the invention may be made from wood, metal or any other material, moulded plastic material being however preferred when it is a question of producing furniture likely to be exposed to weather, such as the table-wheelbarrow.

I claim:

1. A folding table having a folded and unfolded configuration, and comprising:
   (a) a table top supported above a horizontally-extending frame, said frame including a ground engaging wheel adjacent one end and ground-engaging support means adjacent the opposite end of said frame;
   (b) said table top comprised of two inner top sections having inner ends hinged together and two outer top sections having inner ends hinged to a respective outer end of said inner top sections;
   (c) first and second leg means having upper and lower ends, a lower end portion of each leg means being pivoted to respective opposing ends of said frame and the upper end of each leg mean being fixedly secured to respective ones of said outer top sections;

whereby in said folded configuration the two inner top sections are folded into an upright parallel position next to each other, the two outer top sections are folded into an upright parallel position next to the two inner sections, each of said leg means extend horizontally along said frame parallel thereto, and said wheel and said ground-engaging supports support the table above the ground thereby permitting the folded table to be moved by rolling, and in said unfolded configuration the two inner and two outer top sections define a single planar, horizontally extending table top surface in vertically spaced-apart relation to the frame and the leg means engage the ground and extend vertically upwardly from the frame.

2. A folding table according to claim 1 wherein said frame spaces the wheel apart from contact with the ground when the folding table is in its unfolded configuration and engages the wheel with the ground when the folding table is in its folded configuration.

3. A folding table according to claim 2, wherein said frame includes handle means for gripping and lifting the assembly for moving the folding table by rolling.

4. A folding table according to claim 3 whereby in said folded configuration the frame of the folding table defines a support adapted for receiving a load to be transported by the folding table when rolling on its ground engaging wheel.

* * * * *